A. J. KERCHER.
TEMPERATURE REGULATING DEVICE.
APPLICATION FILED NOV. 18, 1911.
1,047,536.
Patented Dec. 17, 1912.
2 SHEETS—SHEET 2.
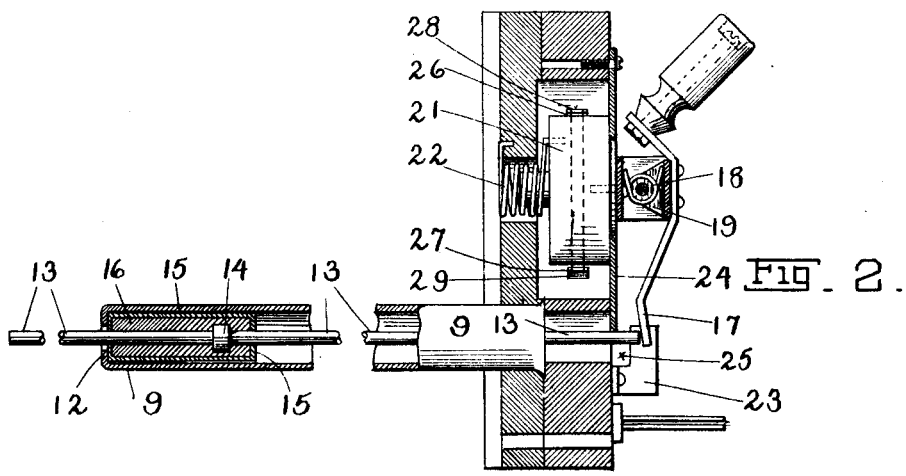
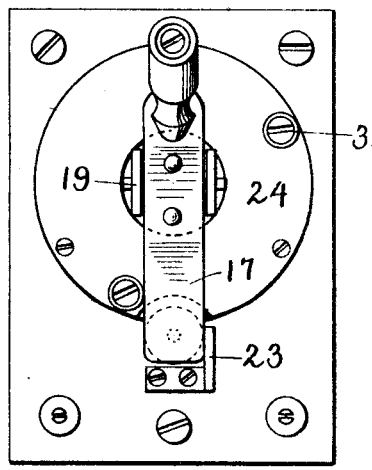
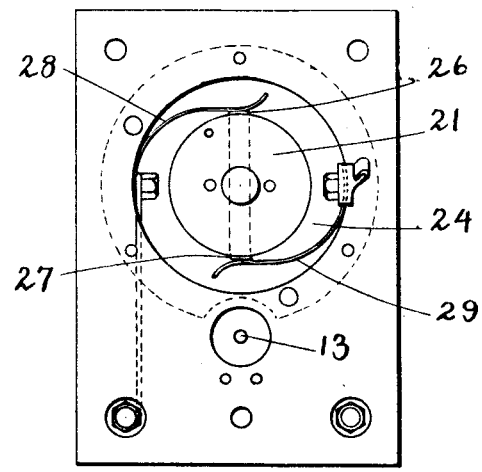
WITNESSES:
INVENTOR
ARTHUR J. KERCHER.
BY
HIS ATTORNEYS

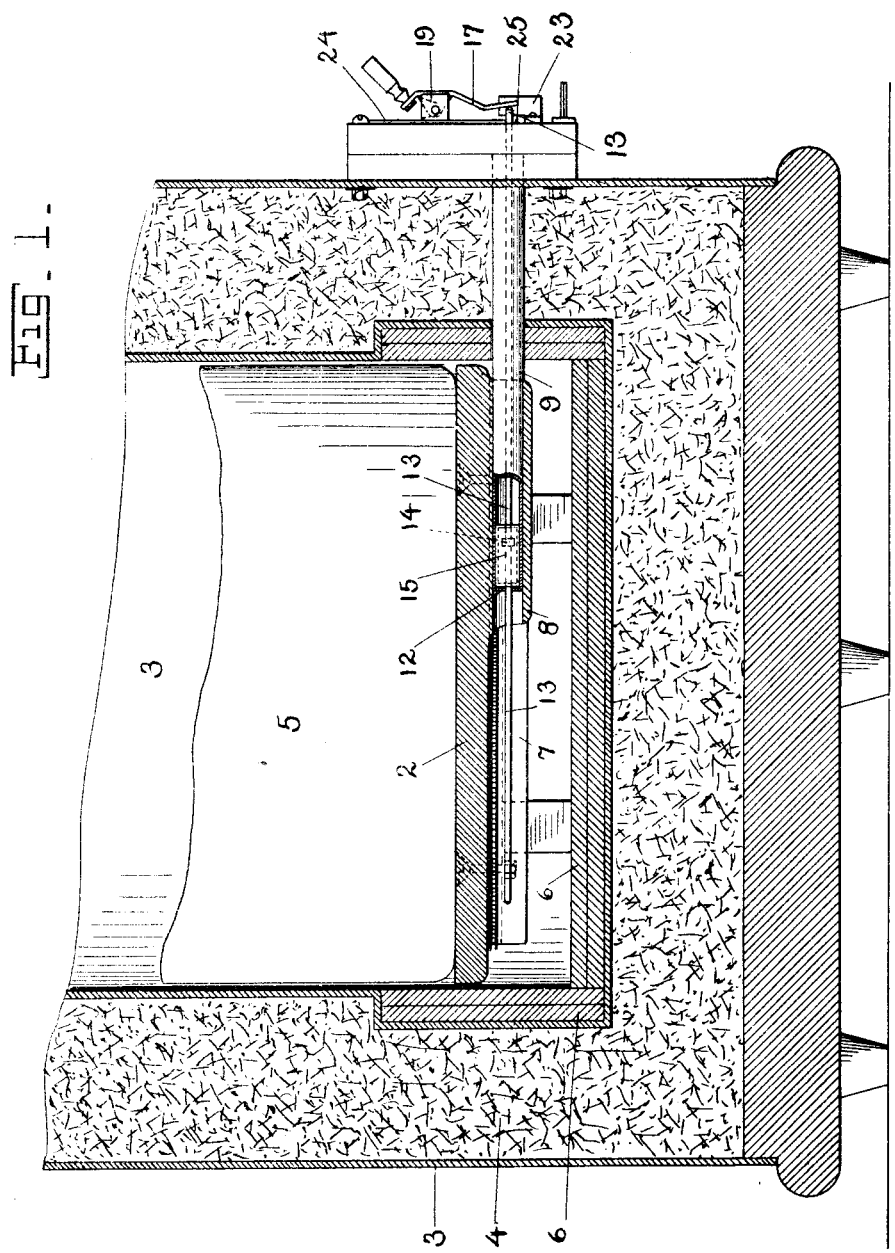

UNITED STATES PATENT OFFICE.

ARTHUR J. KERCHER, OF BERKELEY, CALIFORNIA, ASSIGNOR TO BERKELEY ELECTRIC COOKER COMPANY, OF BERKELEY, CALIFORNIA, A CORPORATION OF CALIFORNIA.

TEMPERATURE-REGULATING DEVICE.

1,047,536.  Specification of Letters Patent.  Patented Dec. 17, 1912.

Application filed November 18, 1911. Serial No. 661,094.

*To all whom it may concern:*

Be it known that I, ARTHUR J. KERCHER, a citizen of the United States, and a resident of Berkeley, county of Alameda, and State of California, have invented certain new and useful Improvements in Temperature-Regulating Devices, of which the following is a specification.

The invention relates to temperature regulating devices for indicating when the desired temperature is obtained and particularly for heat regulating devices to be used in connection with electrically heated cookers to automatically break the electric circuit when the temperature reaches a certain maximum.

The object of the invention is to provide means for indicating when the temperature of a hot-plate to be used in a cooker reaches a certain maximum temperature.

Another object of the invention is to provide means for automatically opening the electric circuit in an electrically heated hot-plate when the temperature thereof reaches a certain maximum.

In fireless cookers a plate of iron or soap-stone is used for imparting the necessary heat to the substance to be cooked. This plate is generally heated on a gas or coal range and placed in the cooker and the vessel containing the substance to be cooked placed in the cooker adjacent to said hot-plate. Various substances require various temperatures to properly cook them and a temperature above or below the required temperature produces poor and unsatisfactory results. Heretofore, as far as I am aware, no practical method has been employed to obtain these results, and consequently cooking by means of hot-plates has not been as satisfactory as is desired. By the use of my invention, however, the temperature required is obtained and in electrically heated hot-plates, the electric circuit is automatically opened to prevent a further rise in temperature. This device possesses other advantageous features, which, with the foregoing, will be set forth at length in the following description, where I shall outline in full that form or embodiment of the invention which I have selected for illustration in the drawings accompanying and forming part of the present specification. The novelty of the invention will be included in the claims succeeding said description. From this it will be apparent that I do not restrict myself to the showing made by such drawings and descriptions as I may adopt many variations within the scope of my invention as expressed in said claims.

Referring to the drawings:—Figure 1 is a vertical section through the lower portion of an electrically heated cooker, showing the hot-plate arranged therein and the device of my invention arranged in conjunction therewith. Fig. 2 is a vertical section through the circuit opening means of my invention. Fig. 3 is a front view of the same with the switch in closed position. Fig. 4 is an interior view of the device showing the switch contacts.

The device of my invention is particularly adapted to be used in connection with an electrically heated hot-plate 2 which is used in connection with an electrically heated cooker. The hot-plate 2 is generally arranged within a receptacle 3 formed of a heat insulating material 4 so that all of the heat is utilized in cooking the substance in the vessel 5 placed in the cooker. The lower part of the receptacle 3 adjacent the hot-plate is preferably lined with asbestos 6, for obvious reasons. Arranged on the hot-plate is an electric heating unit 7, which, when a current is flowing therein imparts heat to the hot-plate. The automatically operating switch of my invention is arranged in the electric circuit and is adapted to be opened when the temperature of the hot-plate reaches a certain maximum. Arranged on the hot-plate and preferably integral therewith is a boss 8 having a cylindrical passage extending therethrough. It is evident that as the hot plate becomes heated, the integral boss is also heated to substantially the same temperature. Fitted into the passage in the boss is a metallic tube 9 the inner end of which is partially closed by a flange 12 for reasons which will become apparent hereinafter. Within this tube is removably arranged a rod 13 having fixed at its center a piston or collar 14. This collar 14 is arranged within a cylinder 15 of larger diameter which is filled with a fusible metal or alloy 16. When placed in the tube 9, the cylinder bears against the flange 12, and the alloy being cold, the rod is held immovable with respect to the cylinder. When the alloy becomes heated to such an extent that it fuses the rod may be moved relative to the cylinder and this feature is employed in operating the switch to open the electric circuit or indicate that the proper temperature is reached. The rod 13 extends from the cylinder in opposite directions, one end extending outwardly through the receptacle 3 so that the end lies in operative position with the switch. Bearing against the outer end of the rod is a lever 17, which is pressed against the rod by the coiled spring 18 arranged in the frame 19. It is evident that when the alloy fuses, the rod 13 will be pushed inward by the lever 17.

The frame 19 carrying the spring 18 is attached to the switch block 21 to which is attached the spring 22 which tends to rotate the switch block 21 to open the switch. The switch is held in the closed position by the lever 17 bearing against the bracket 23, the lever being held raised at its outer end by the rod 13. When the alloy melts, however, the lever 17 moves downward toward the front face of the switch plate 24. The lower part of the bracket 23 is cut away to form an aperture 25 through which the end of the lever is moved by the spring 22, as soon as the rod has been forced inward. The switch block 21 is therefore rapidly moved to open the circuit, the contacts 26—27 being moved out of connection with the spring contacts 28—29. After moving out of contact with the bracket 23 the lever springs through an arc of substantially 90° to the stop 31 on the plate 24, holding the switch open and thereby breaking the circuit.

The rod 13 is made of such length that when one end has been pushed inward after the alloy has melted, the other end projects from the cylinder the proper distance so that when the rod is reversed the end projects above the plate 24. In practice several rods with their accompanying cylinders are furnished with each control device. The cylinders contain alloys which melt at different temperatures, so that any temperature may be obtained by selecting the proper rod.

The hot-plate is not necessarily heated within the cooker as the control device will operate with equal efficiency when the plate is removed from the cooker. The plate need not necessarily be heated by an electric current but may be heated from other sources. When the plate becomes heated to the proper temperature the switch is thrown and acts as a signal to indicate that the proper temperature has been reached.

Since the cylinder 15 and the fusible metal contents operate to release the switch, it may be termed for the purposes of brevity, a fusible metal cartridge.

I claim:

1. In an electrically heated hot plate, a heating element, an electric circuit connected thereto, a spring operated switch in said circuit and means operating in conjunction with said hot-plate to open the switch when a certain temperature is reached.

2. The combination of a hot-plate, a cylinder in close relation thereto, a fusible metal in said cylinder, a rod passing through said cylinder and fusible metal, a spring pressed lever bearing against the end of said rod adapted to indicate by its movement when the fusible metal has melted.

3. In an electrically heated hot-plate, a heating element, an electric circuit connected thereto, a manually operable switch in said circuit, a charge of fusible metal in close relation to said hot-plate, and means connecting said fusible metal with said switch adapted to allow the switch to open automatically when the metal melts.

4. The combination with a hot-plate adapted to be heated by a current of electricity, of a manually operable switch in the electric circuit, means for holding the switch in the closed position and means operating in conjunction with the hot-plate to release the switch when the temperature of the plate reaches a certain maximum.

5. The combination with a hot-plate adapted to be heated by a current of electricity, of a switch in the electric circuit, means for holding said switch in the closed position comprising a rod adapted to lie in close relation to said hot-plate, means for holding said rod in position to hold the switch closed comprising a fusible metal cartridge on said rod and means for automatically opening said switch when the fusible metal melts.

6. A temperature regulating device for electrically heated hot-plates comprising a fusible metal cartridge arranged in close relation to the hot-plate and adapted to be heated thereby, an electric circuit, a switch in the electric circuit, a rod extending from said cartridge to said switch and adapted to hold the switch in the closed position while the fusible metal is solid, a spring pressed lever bearing against the end of the rod and controlling the position of the switch, said switch being arranged to be automatically opened by the inward movement of the rod when the fusible metal has melted.

7. A temperature regulating device for electrically heated hot-plates comprising a fusible metal cartridge arranged in close relation to the hot-plate and adapted to be heated thereby, an electric circuit, a switch in the electric circuit, a spring tending to move said switch to the open position, a pivotally arranged spring held lever on said switch, a bracket adapted to be contacted with by said lever to hold the switch in the closed position, a rod engaging said cartridge and said lever to hold it in engagement with said bracket, said rod being movable to release the switch when the fusible metal melts.

8. An electrically heated hot-plate having a hollow integral boss formed thereon, a metallic tube arranged in said boss having a partially closed inner end, a rod arranged in said tube and projecting therefrom, a fusible metal cartridge on said rod engaging said partially closed inner end, a spring pressed lever adapted to move said rod longitudinally when the fusible metal melts, an electric circuit, a switch in the electric circuit and means released by the movement of the rod, for opening said switch.

In testimony whereof, I have hereunto set my hand at San Francisco, Cal., this 13th day of November, 1911.

ARTHUR J. KERCHER.

In presence of—
H. G. PROST,
R. HEFFERNAN.